US012789889B1

(12) United States Patent
Abuaita et al.

(10) Patent No.: US 12,789,889 B1
(45) Date of Patent: Nov. 10, 2026

(54) VEHICLE REAR STEERING SYSTEM AND METHOD

(71) Applicant: GM Global Technology Operations LLC, Detroit, MI (US)

(72) Inventors: Raed Nasim Abuaita, Fenton, MI (US); Brian K. Saylor, South Lyon, MI (US); Brock Morris, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/269,430

(22) Filed: Jul. 15, 2025

(51) Int. Cl.
*B62D 5/04* (2006.01)
*B62D 15/02* (2006.01)

(52) U.S. Cl.
CPC ........... *B62D 5/0484* (2013.01); *B62D 5/046* (2013.01); *B62D 15/021* (2013.01)

(58) Field of Classification Search
CPC ..... B62D 5/0484; B62D 5/046; B62D 15/021
See application file for complete search history.

(56) References Cited

U.S. PATENT DOCUMENTS 9,199,666 B2 * 12/2015 Pugsley ................. B62D 5/046

* cited by examiner

*Primary Examiner* — Xiao En Mo
(74) *Attorney, Agent, or Firm* — Vivacqua Crane, PLLC

(57) ABSTRACT

A method for controlling a rear steering motor for a vehicle may include identifying a primary power failure condition of the rear steering motor in response to determining that the rear steering motor is not receiving power from a primary power source. The method further may include calculating a maximum rear steering angle limit for the rear steering motor in response to identifying the primary power failure condition. The method further may include maintaining a rear steering angle of the rear steering motor within the maximum rear steering angle limit by actuating the rear steering motor using a secondary power source. The method further may include locking the rear steering motor in response to determining that the rear steering angle is substantially equal to zero.

20 Claims, 4 Drawing Sheets

VEHICLE REAR STEERING SYSTEM AND METHOD

INTRODUCTION

The present disclosure relates to systems and methods for rear wheel steering in vehicle applications.

To enable enhanced maneuverability and control, vehicles may be equipped with rear steering systems. Rear steering systems typically include actuators and mechanical linkages configured to alter the angle of the rear wheels relative to the longitudinal axis of the vehicle. In some examples, rear steering systems may be configured to operate in coordination with the front steering system to reduce turning radius during low-speed maneuvers. In other examples, the system may adjust the rear wheel angles oppositely or similarly to the front wheels depending on vehicle speed, trajectory, or operational mode. Rear steering systems may receive inputs from various sources, including driver commands, vehicle sensors, and advanced driver-assistance systems (ADAS) and actuate the rear steering actuator accordingly. In some implementations, rear steering systems may be configured to dynamically adjust steering parameters based on vehicle speed, yaw rate, and lateral acceleration inputs. Mechanical components of the system may include linkages, bushings, and mounts configured to transmit actuation forces while maintaining alignment under load.

While systems and methods for rear steering achieve their intended purpose, there is a need for new and improved systems and methods for vehicle rear steering systems.

SUMMARY

According to several aspects, a method for controlling a rear steering motor for a vehicle is provided. The method may include identifying a primary power failure condition of the rear steering motor in response to determining that the rear steering motor is not receiving power from a primary power source. The method further may include calculating a maximum rear steering angle limit for the rear steering motor in response to identifying the primary power failure condition. The method further may include maintaining a rear steering angle of the rear steering motor within the maximum rear steering angle limit by actuating the rear steering motor using a secondary power source. The method further may include locking the rear steering motor in response to determining that the rear steering angle is substantially equal to zero.

In another aspect of the present disclosure, identifying the primary power failure condition of the rear steering motor further may include identifying a primary power failure condition of the rear steering motor in response to determining that the rear steering motor is not receiving power from the primary power source. The primary power source includes at least one of: a low-voltage battery of the vehicle and a high-voltage battery of the vehicle.

In another aspect of the present disclosure, calculating the maximum rear steering angle limit further may include calculating the maximum rear steering angle limit based at least in part on a state of charge of the secondary power source. The maximum rear steering angle limit varies directly with the state of charge of the secondary power source when the state of charge of the secondary power source is less than a predetermined state of charge threshold.

In another aspect of the present disclosure, calculating the maximum rear steering angle limit further may include calculating the maximum rear steering angle limit based at least in part on a speed of the vehicle. The maximum rear steering angle limit varies inversely with the speed of the vehicle when the speed of the vehicle is greater than a predetermined speed threshold.

In another aspect of the present disclosure, calculating the maximum rear steering angle limit further may include calculating the maximum rear steering angle limit based at least in part on an elapsed time since identifying the primary power failure condition. The maximum rear steering angle limit varies inversely with the elapsed time when the elapsed time is greater than a predetermined elapsed time threshold.

In another aspect of the present disclosure, calculating the maximum rear steering angle limit further may include calculating the maximum rear steering angle limit based at least in part on an initial rear steering angle of the rear steering motor. The maximum rear steering angle limit is less than or equal to the initial rear steering angle. The initial rear steering angle is measured in response to identifying the primary power failure condition.

In another aspect of the present disclosure, maintaining the rear steering angle of the rear steering motor within the maximum rear steering angle limit further may include maintaining the rear steering angle of the rear steering motor within the maximum rear steering angle limit by actuating the rear steering motor using the secondary power source. An energy storage capacity of the secondary power source is less than an energy storage capacity of the primary power source.

In another aspect of the present disclosure, maintaining the rear steering angle of the rear steering motor within the maximum rear steering angle limit further may include maintaining the rear steering angle of the rear steering motor within the maximum rear steering angle limit by actuating the rear steering motor using the secondary power source. The secondary power source is more proximal to the rear steering motor than the primary power source.

In another aspect of the present disclosure, maintaining the rear steering angle of the rear steering motor within the maximum rear steering angle limit further may include maintaining the rear steering angle of the rear steering motor within the maximum rear steering angle limit by actuating the rear steering motor using the secondary power source. The secondary power source includes at least one of: a rechargeable battery and a supercapacitor.

In another aspect of the present disclosure, locking the rear steering motor further may include electrically connecting two or more motor terminals of the rear steering motor together.

According to several aspects, a system for controlling a rear steering motor for a vehicle is provided. The system for controlling the rear steering motor may include the rear steering motor having two or more motor terminals. The system further may include a relay in electrical communication with the two or more motor terminals of the rear steering motor. The system further may include a secondary power source configured to provide power to the rear steering motor. An energy storage capacity of the secondary power source is less than an energy storage capacity of a primary power source of the vehicle. The system further may include a controller in electrical communication with the rear steering motor, the relay, and the secondary power source. The controller is programmed to identify a primary power failure condition of the rear steering motor in response to determining that the rear steering motor is not receiving power from the primary power source. The controller is further programmed to calculate a maximum rear steering angle limit for the rear steering motor in response to identifying the primary power failure condition. The controller is further programmed to maintain a rear steering angle of the rear steering motor within the maximum rear steering angle limit by actuating the rear steering motor using the secondary power source. The controller is further programmed to lock the rear steering motor using the relay in response to determining that the rear steering angle is substantially equal to zero.

In another aspect of the present disclosure, to calculate the maximum rear steering angle limit, the controller is further programmed to calculate a state of charge angle limit based at least in part on a state of charge of the secondary power source. To calculate the maximum rear steering angle limit, the controller is further programmed to calculate a speed angle limit based at least in part on a speed of the vehicle. To calculate the maximum rear steering angle limit, the controller is further programmed to calculate an elapsed time angle limit based at least in part on an elapsed time since identifying the primary power failure condition. To calculate the maximum rear steering angle limit, the controller is further programmed to calculate an initial angle limit based at least in part on an initial rear steering angle of the rear steering motor. The initial angle limit is less than or equal to the initial rear steering angle. The initial rear steering angle is measured in response to identifying the primary power failure condition. To calculate the maximum rear steering angle limit, the controller is further programmed to calculate the maximum rear steering angle limit to be a minimum of the state of charge angle limit, the speed angle limit, the elapsed time angle limit, and the initial angle limit.

In another aspect of the present disclosure, the state of charge angle limit varies directly with the state of charge of the secondary power source when the state of charge of the secondary power source is less than a predetermined state of charge threshold.

In another aspect of the present disclosure, the speed angle limit varies inversely with the speed of the vehicle when the speed of the vehicle is greater than a predetermined speed threshold.

In another aspect of the present disclosure, the elapsed time angle limit varies inversely with the elapsed time when the elapsed time is greater than a predetermined elapsed time threshold.

In another aspect of the present disclosure, the primary power source includes at least one of: a low-voltage battery of the vehicle and a high-voltage battery of the vehicle. The secondary power source includes at least one of: a rechargeable battery and a supercapacitor.

In another aspect of the present disclosure, the relay further may include a first set of relay terminals. Each of the first set of relay terminals are electrically isolated from each other. One of the first set of relay terminals is in electrical communication with each of the two or more motor terminals of the rear steering motor. The relay further may include a second set of relay terminals. Each of the second set of relay terminals are electrically connected to each other. The relay further may include a plurality of electromagnetically controllable switches. Each of the first set of relay terminals is connected to one of the second set of relay terminals with one of the plurality of electromagnetically controllable switches. Each of the plurality of electromagnetically controllable switches is normally closed. The relay further may include an energizing coil for controlling the plurality of electromagnetically controllable switches. The plurality of electromagnetically controllable switches are open when the energizing coil is energized and closed when the energizing coil is deenergized. The energizing coil is in electrical communication with the controller. To lock the rear steering motor using the relay, the controller is further programmed to monitor the rear steering angle of the rear steering motor. To lock the rear steering motor using the relay, the controller is further programmed to deenergize the energizing coil of the relay to close the plurality of electromagnetically controllable switches and electrically connect the two or more motor terminals of the rear steering motor together in response to determining that the rear steering angle is substantially equal to zero.

According to several aspects, a method for controlling a rear steering motor for a vehicle is provided. The method may include identifying a primary power failure condition of the rear steering motor in response to determining that the rear steering motor is not receiving power from a primary power source using a controller. The primary power source includes at least one of a low-voltage battery of the vehicle and a high-voltage battery of the vehicle. The method further may include calculating a maximum rear steering angle limit for the rear steering motor using the controller in response to identifying the primary power failure condition. The method further may include maintaining a rear steering angle of the rear steering motor within the maximum rear steering angle limit using the controller by actuating the rear steering motor using a secondary power source. The secondary power source includes at least one of a rechargeable battery and a supercapacitor. The method further may include locking the rear steering motor by using the controller to operate a relay in response to determining that the rear steering angle is substantially equal to zero.

In another aspect of the present disclosure, calculating the maximum rear steering angle limit further may include calculating a state of charge angle limit based at least in part on a state of charge of the secondary power source. The state of charge angle limit varies directly with the state of charge of the secondary power source when the state of charge of the secondary power source is less than a predetermined state of charge threshold. Calculating the maximum rear steering angle limit further may include calculating a speed angle limit based at least in part on a speed of the vehicle. The speed angle limit varies inversely with the speed of the vehicle when the speed of the vehicle is greater than a predetermined speed threshold. Calculating the maximum rear steering angle limit further may include calculating an elapsed time angle limit based at least in part on an elapsed time since identifying the primary power failure condition. The elapsed time angle limit varies inversely with the elapsed time when the elapsed time is greater than a predetermined elapsed time threshold. Calculating the maximum rear steering angle limit further may include calculating an initial angle limit based at least in part on an initial rear steering angle of the rear steering motor. The initial angle limit is less than or equal to the initial rear steering angle. The initial rear steering angle is measured in response to identifying the primary power failure condition. Calculating the maximum rear steering angle limit further may include calculating the maximum rear steering angle limit to be a minimum of the state of charge angle limit, the speed angle limit, the elapsed time angle limit, and the initial angle limit.

In another aspect of the present disclosure, locking the rear steering motor further may include monitoring the rear steering angle of the rear steering motor. Locking the rear steering motor further may include deenergizing an energizing coil of the relay to close a plurality of electromagnetically controllable switches of the relay in response to determining that the rear steering angle is substantially equal to zero. Each of the plurality of electromagnetically controllable switches electrically connects one of a first set of relay terminals of the relay to one of a second set of relay terminals of the relay. Each of the first set of relay terminals is in electrical communication with one of two or more motor terminals of the rear steering motor. Each of the second set of relay terminals are electrically connected together.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, vehicles may include rear steering systems which turn the rear wheels to allow for improved cornering and maneuvering performance. In aspects of the present disclosure, it is advantageous to return the rear wheels to a default position (e.g., straight) in the event of a power failure or other fault condition to allow the vehicle to be safely driven or towed. Accordingly, the present disclosure provides a new and improved rear steering system and method for controlling the rear steering system which is operable to return the rear wheels to a default position in the event of a power failure or other fault condition.

Figure 1:
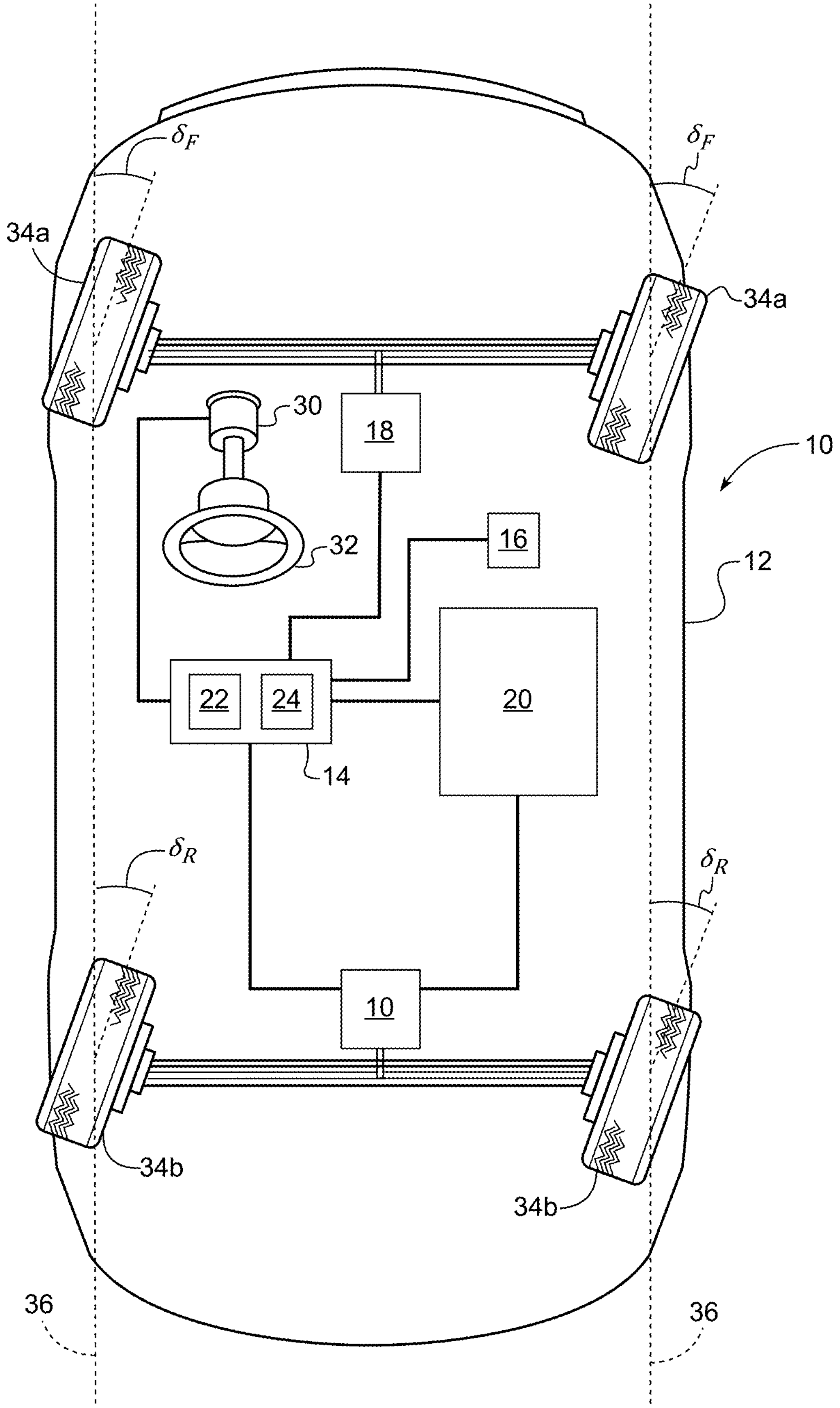
FIG. 1 is a schematic diagram of a vehicle including a rear steering system for controlling a rear steering motor, according to an exemplary embodiment.

Referring to FIG. 1, a rear steering system for controlling a rear steering motor for a vehicle is illustrated and generally indicated by reference number 10. The rear steering system 10 is shown with an exemplary vehicle 12. While a passenger vehicle is illustrated, it should be appreciated that the vehicle 12 may be any type of vehicle without departing from the scope of the present disclosure. The vehicle 12 generally includes a vehicle controller 14, a plurality of vehicle sensors 16, a front steering system 18, and a primary power source 20.

The vehicle controller 14 is used to manage and control vehicle systems to provide various functions and features of the vehicle 12, as will be discussed in greater detail below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions.

The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12.

The vehicle controller 14 may also include multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the rear steering system 10, the plurality of vehicle sensors 16, the front steering system 18, and the primary power source 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 16 are used to acquire information relevant to the vehicle 12. In an exemplary embodiment, the plurality of vehicle sensors 16 includes sensors to determine performance data about the vehicle 12. In a non-limiting example, the plurality of vehicle sensors 16 includes at least one of a motor speed sensor, a motor torque sensor, an electric drive motor voltage and/or current sensor, an accelerator pedal position sensor, a wheel speed sensor, a brake position sensor, a coolant temperature sensor, a cooling fan speed sensor, a transmission oil temperature sensor, an inertial measurement unit (IMU), an accelerometer, and a steering wheel angle sensor 30 for sensing a rotational angle of a steering wheel 32 operated by an occupant of the vehicle 12.

In another exemplary embodiment, the plurality of vehicle sensors 16 further includes sensors to determine information about an environment within the vehicle 12. In a non-limiting example, the plurality of vehicle sensors 16 further includes at least one of a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about an environment surrounding the vehicle 12. In a non-limiting example, the plurality of vehicle sensors 16 further includes at least one of an ambient air temperature sensor, a barometric pressure sensor, a global navigation satellite system (GNSS), and/or a photo and/or video camera which is positioned to view the environment surrounding the vehicle 12. The plurality of vehicle sensors 16 is in electrical communication with the vehicle controller 14 as discussed above.

The front steering system 18 is used to control a front steering angle $\delta_F$ of the vehicle 12. The front steering angle $\delta_F$ is defined as zero when the vehicle 12 is driving straight forward, positive when the front wheels 34*a* are turned clockwise, and negative when the front wheels 34*a* are turned counterclockwise. Therefore, the absolute value of the front steering angle $|\delta_F|$ corresponds to a turning magnitude of the front wheels 34*a* in either direction. In an exemplary embodiment, the front steering system 18 includes at least a front steering motor (not shown) coupled to one or more front steering linkages (not shown) for turning the front wheels 34*a* of the vehicle 12. In a non-limiting example, the front steering motor is an electric actuator, such as a brushless direct current (DC) motor or an electric servo motor, capable of generating the necessary torque to drive the one or more front steering linkages. The front steering system 18 may also include power electronics (not shown) such as power converters, inverters, motor controllers, and/or the like to drive the front steering motor. In a non-limiting example, the one or more front steering linkages include a gear assembly, such as a rack-and-pinion or ball-screw mechanism, which translates the rotational output of the front steering motor into linear motion to steer the front wheels 34*a*.

The front steering system 18 is configured to be controlled by the vehicle controller 14. In an exemplary embodiment, the vehicle controller 14 is in direct communication with the power electronics of the front steering system 18 to control the front steering motor. In another exemplary embodiment, the front steering system 18 further includes a front steering controller (not shown) in communication with the vehicle controller 14 and the power electronics of the front steering system 18 to control the front steering motor. The front steering controller is configured to actuate the front steering motor in response to front steering setpoint commands received from the vehicle controller 14. The front steering system 18 is in electrical communication with the vehicle controller 14 as discussed above.

The primary power source 20 is used to provide energy for vehicle systems and components, including, for example, the vehicle controller 14, the plurality of vehicle sensors 16, the front steering system 18, and the rear steering system 10. In an exemplary embodiment, the primary power source 20 is a high-voltage battery (e.g., two hundred to eight hundred volts). In a non-limiting example, the high-voltage battery is a traction battery of the vehicle 12. The traction battery stores and provides electrical energy in the form of direct current (DC). In an exemplary embodiment, the traction battery includes a plurality of battery cells (e.g., lithium-ion battery cells) electrically connected in series and/or parallel to provide an increased voltage and/or current-carrying capacity. In an exemplary embodiment, the traction battery further includes a battery management system (BMS) configured to monitor battery characteristics such as a state of charge (SOC), state of health (SOH), temperature, and/or the like, and transmit the battery characteristics to the vehicle controller 14. In a non-limiting example, the BMS includes a BMS controller in electrical communication with a plurality of BMS sensors disposed within an enclosure of the traction battery.

In another exemplary embodiment, the primary power source 20 is a low-voltage battery (e.g., six to twenty-four volts) such as a starter battery of the vehicle 12. In a non-limiting example, the low-voltage battery is a lead-acid battery, absorbent glass mat (AGM) battery, gel cell battery, lithium-ion battery, and/or the like. It should be understood that the primary power source 20 may include any power source configured to provide energy for vehicle systems and components. The primary power source 20 is in electrical communication with the vehicle controller 14 as discussed above.

In an exemplary embodiment, the vehicle controller 14 is programmed to measure conditions using the plurality of vehicle sensors 16 and control the front steering system 18 and the rear steering system 10 based on the measured conditions. In an exemplary embodiment, the vehicle controller 14 measures a steering wheel angle of the steering wheel 32 using the steering wheel angle sensor 30. In another exemplary embodiment, the steering wheel angle is generated by an autonomous driving system or an advanced driver-assistance system (ADAS). In a first mode, the vehicle controller 14 uses the front steering system 18 to adjust the front steering angle $\delta_F$ based at least in part on the steering wheel angle. In an exemplary embodiment, the vehicle controller 14 and/or the front steering system 18 are programmed to maintain the front steering angle $\delta_F$ within a maximum front steering angle limit. The maximum front steering angle limit is defined as a maximum absolute value of the front steering angle $\delta_F$. The maximum front steering angle limit may be static (e.g., based on mechanical limitations of the front steering system 18) or dynamic, as will be discussed below.

In the first mode, the vehicle controller 14 operates the rear steering system 10 to maintain a rear steering angle $\delta_R$ substantially equal to zero degrees. The rear steering angle $\delta_R$ is defined as zero when the vehicle 12 is driving straight forward, positive when the rear wheels 34*b* are turned clockwise, and negative when the rear wheels 34*b* are turned counterclockwise. Therefore, the absolute value of the rear steering angle $|\delta_R|$ corresponds to a turning magnitude of the rear wheels 34*b* in either direction. In the scope of the present disclosure, “substantially” means within a predetermined margin of error or range of a given value (e.g., five percent). In the scope of the present disclosure, “zero degrees” means the vehicle 12 is driving straight forward, i.e., that the rear wheels 34*b* are aligned parallel to a longitudinal axis 36 of the vehicle 12.

In a second mode, the vehicle controller 14 uses both the front steering system 18 and the rear steering system 10 to provide a four-wheel-steering capability for enhanced turning performance in on-road and/or off-road environments. In the second mode, the vehicle controller 14 uses the front steering system 18 and the rear steering system 10 to adjust the front steering angle $\delta_F$ and the rear steering angle $\delta_R$ based at least in part on the steering wheel angle. In an exemplary embodiment, the vehicle controller 14, the front steering system 18, and/or the rear steering system 10 are programmed to maintain the front steering angle $\delta_F$ within a maximum front steering angle limit and to maintain the rear steering angle $\delta_R$ within a maximum rear steering angle limit.

The maximum front steering angle limit is defined as a maximum absolute value of the front steering angle $\delta_F$. The maximum rear steering angle limit is defined as a maximum absolute value of the rear steering angle $\delta_R$. The maximum front and rear steering angle limits may be static (e.g., based on mechanical limitations of the front steering system 18 and the rear steering system 10) or dynamic, as will be discussed below. The maximum front steering angle limit may or may not be the same as the maximum rear steering angle limit.

In an exemplary embodiment, the vehicle controller 14 operates the front steering system 18 and the rear steering system 10 such that the front steering angle $\delta_F$ and the rear steering angle $\delta_R$ are substantially equal. In another exemplary embodiment, the vehicle controller 14 operates the front steering system 18 and the rear steering system 10 such that the rear steering angle $\delta_R$ is some multiple of the front steering angle $\delta_F$. In a non-limiting example, the multiple is less than one. In another non-limiting example, the multiple is negative (resulting in an opposite direction of rotation of the rear wheels 34*b* relative to the front wheels 34*a*). In another non-limiting example, the multiple is constant. In another non-limiting example, the multiple is dynamic (e.g., based on vehicle speed). It should be understood that the vehicle controller 14 may be programmed to provide any linear, nonlinear, static, dynamic, positive, negative, direct, inverse, or other relationship between the front steering angle $\delta_F$ and the rear steering angle $\delta_R$ using the front steering system 18 and the rear steering system 10.

In an exemplary embodiment, in the event that the front steering angle $\delta_F$ violates the maximum front steering angle limit or the rear steering angle $\delta_R$ violates the maximum rear steering angle limit (e.g., due to dynamic changes in the maximum steering angle limits, as will be discussed below), the vehicle controller 14, the front steering system 18 and/or the rear steering system 10 are configured to smoothly and automatically adjust the front steering angle $\delta_F$ and/or the rear steering angle δR such that the front steering angle $\delta_F$ is within the maximum front steering angle limit and the rear steering angle $\delta_R$ is within the maximum rear steering angle limit. In a non-limiting example, automatic correction of the front steering angle $\delta_F$ or rear steering angle $\delta_R$ is paused or disabled under certain operational conditions, for example, if vehicle speed is above a predetermined threshold, lateral vehicle acceleration is above a predetermined threshold, and/or the like.

Figure 2:
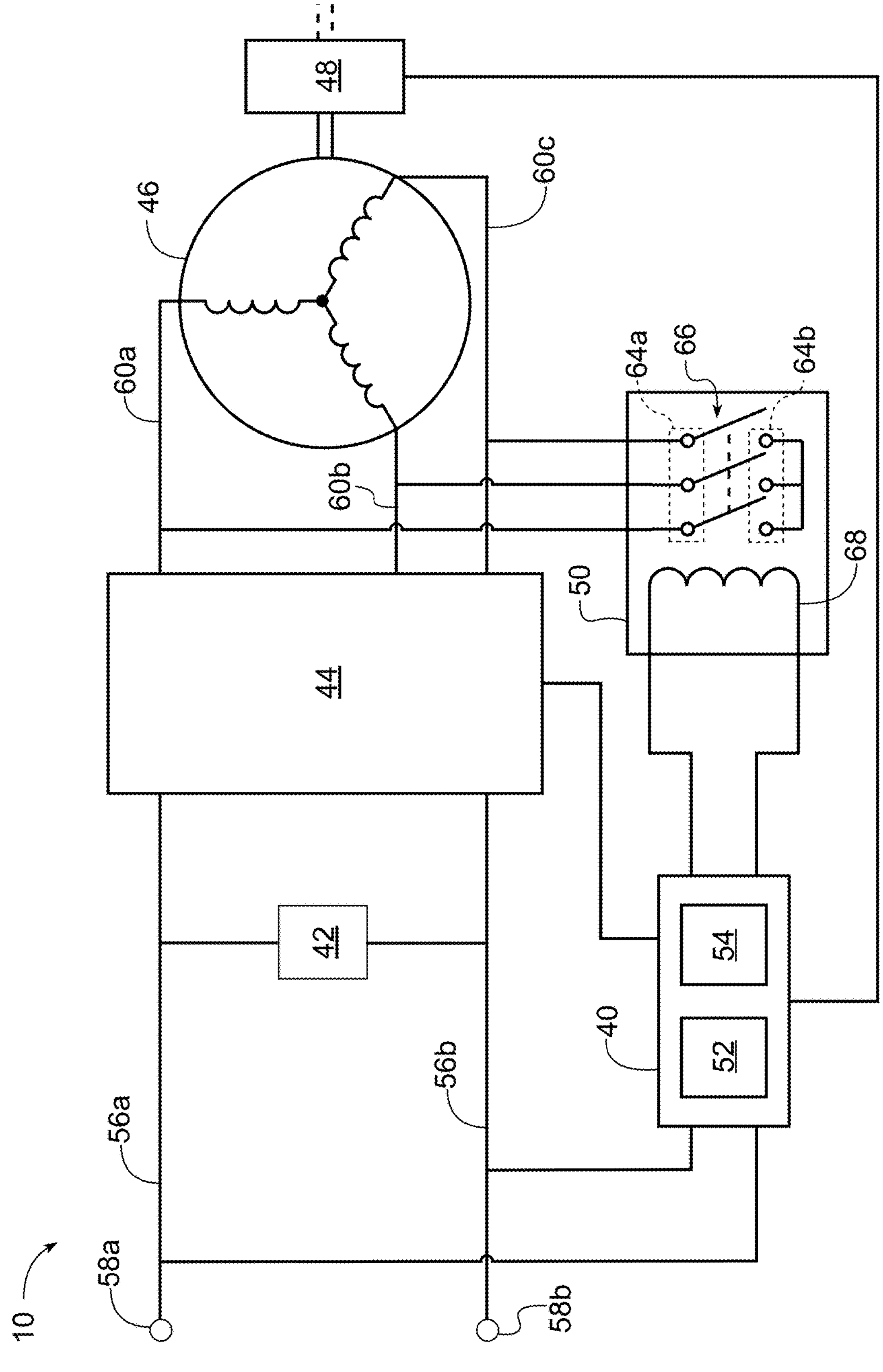
FIG. 2 is a schematic diagram of the rear steering system, according to an exemplary embodiment.

Referring to FIG. 2, a schematic diagram of the rear steering system 10 is shown. The rear steering system 10 generally includes a rear steering controller 40, a secondary power source 42, a motor controller 44, a rear steering motor 46, a rear steering angle sensor 48, and a relay 50.

The rear steering controller 40 is used to implement a method 100 for controlling the rear steering motor 46, as will be described below. In an exemplary embodiment, the rear steering controller 40 is integral with the vehicle controller 14. In another exemplary embodiment, the rear steering controller 40 is implemented as a software module running on the vehicle controller 14. In another exemplary embodiment, the rear steering controller 40 is a separate hardware device from the vehicle controller 14, as will be described below.

In an exemplary embodiment, the rear steering controller 40 includes at least one processor 52 and a non-transitory computer readable storage device or media 54. The processor 52 may be a custom made or commercially available processor, a central processing unit (CPU), a graphics processing unit (GPU), an auxiliary processor among several processors associated with the rear steering controller 40, a semiconductor-based microprocessor (in the form of a microchip or chip set), a macroprocessor, a combination thereof, or generally a device for executing instructions.

The computer readable storage device or media 54 may include volatile and nonvolatile storage in read-only memory (ROM), random-access memory (RAM), and keep-alive memory (KAM), for example. KAM is a persistent or non-volatile memory that may be used to store various operating variables while the processor 52 is powered down. The computer-readable storage device or media 54 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the rear steering controller 40 to control the rear steering motor 46.

The rear steering controller 40 is in electrical communication with the secondary power source 42, the motor controller 44, the rear steering angle sensor 48, the relay 50, the primary power source 20, and the vehicle controller 14. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the rear steering controller 40 are within the scope of the present disclosure. It should further be understood that, in the scope of the present disclosure, electrical communication also includes power and/or energy transfer between electrical devices (e.g., using conducting wires and/or wireless power transmission techniques). In an exemplary embodiment, the rear steering controller 40 is proximal to the rear steering motor 46. In a non-limiting example, the rear steering controller 40 is more proximal to the rear steering motor 46 than the vehicle controller 14. For example, the rear steering controller 40 is in a housing which is affixed to or adjacent to the rear steering motor 46, while the vehicle controller 14 is located in an engine compartment of the vehicle 12.

In an exemplary embodiment, the rear steering controller 40 is configured to actuate the rear steering motor 46 based at least in part on rear steering setpoint commands received from the vehicle controller 14. In the event that the rear steering angle $\delta_R$ violates the maximum rear steering angle limit (e.g., due to dynamic changes in the maximum rear steering angle limit, as will be discussed below), the rear steering controller 40 is configured to smoothly and automatically adjust the rear steering angle $\delta_R$ such that the rear steering angle $\delta_R$ is within the maximum rear steering angle limit. In a non-limiting example, automatic correction of the rear steering angle $\delta_R$ is paused or disabled under certain operational conditions, for example, if vehicle speed is above a predetermined threshold, lateral vehicle acceleration is above a predetermined threshold, and/or the like.

The secondary power source 42 is used to provide backup power to the rear steering system 10 in the event that the rear steering system 10 does not receive power from the primary power source 20. In an exemplary embodiment, the secondary power source 42 is a rechargeable energy storage device. In a non-limiting example, an energy storage capacity (e.g., measured in watt-hours) of the secondary power source 42 is less than an energy storage capacity of the primary power source 20. In a non-limiting example, the secondary power source 42 is more proximal (i.e., located closer to) the rear steering motor 46 than the primary power source 20. For example, the secondary power source 42 is in a housing which is affixed to or adjacent to the rear steering motor 46, while the primary power source 20 is located in an engine compartment or a battery compartment of the vehicle 12. In an exemplary embodiment, the secondary power source 42 includes a rechargeable battery (e.g., a lithium-ion battery) and/or a supercapacitor. It should be understood that the secondary power source 42 may be realized using any device capable of storing and releasing electrical energy.

The secondary power source 42 is connected to a positive bus **56*a* and a negative bus 56*b*. The positive bus 56*a* and the negative bus 56*b* provide power to the rear steering controller 40 and the rear steering motor 46 via the motor controller 44. In normal operation, the positive bus 56*a* and the negative bus 56*b* are also powered by the primary power source 20 via bus terminals 58*a*, 58*b*. Therefore, when the primary power source 20 is available and powering the rear steering system 10, the secondary power source 42 is charged by the primary power source 20. Furthermore, the rear steering controller 40 can detect and measure characteristics of the secondary power source 42** (e.g., state of charge).

The motor controller 44 is used to power and control the rear steering motor 46. In an exemplary embodiment, the motor controller 44 includes an H-bridge circuit for bi-directional control of DC motors. In another exemplary embodiment, the motor controller 44 includes a multi-phase power inverter for control of muti-phase alternating current (AC) or brushless DC (BLDC) motors. In a non-limiting example, the motor controller 44 is a brushless DC motor controller including a plurality (e.g., six) semiconductor switches (e.g., metal-oxide-semiconductor field-effect transistors (MOSFETs)) controlled by the rear steering controller 40 using pulse-width modulation (PWM) to produce a three-phase rotating electric field to drive the rear steering motor 46 with a desired speed, torque, and direction of rotation. It should be understood that other types and topologies of motor controllers are also within the scope of the present disclosure.

The rear steering motor 46 is used to control the rear steering angle $\delta_R$ of the vehicle 12. In an exemplary embodiment, the rear steering motor 46 includes an electric actuator, such as a brushless direct current (DC) motor or an electric servo motor, capable of generating the necessary torque to drive one or more rear steering linkages. In a non-limiting example, the rear steering motor 46 is a brushless DC (BLDC) motor having two or more motor terminals in electrical communication with the motor controller 44 and the relay 50. In a non-limiting example, the two or more motor terminals include a first motor terminal **60*a*, a second motor terminal 60*b*, and a third motor terminal 60*c*. In an exemplary embodiment, the one or more rear steering linkages include a gear assembly, such as a rack-and-pinion or ball-screw mechanism, which translates the rotational output of the rear steering motor 46 into linear motion to steer the rear wheels 34*b*. The rear steering motor 46 is configured to be controlled by the rear steering controller 40 via the motor controller 44** as discussed above.

The rear steering angle sensor 48 is used to sense a rotational angle of the rear steering motor 46 in order to determine the rear steering angle $\delta_R$. In an exemplary embodiment, the rear steering angle sensor 48 is a potentiometer, rotary encoder, resolver, hall effect sensor, and/or the like mechanically connected to a shaft of the rear steering motor 46 and/or a component of the one or more rear steering linkages. It should be understood that any suitable sensor may be used within the scope of the present disclosure. The rear steering angle sensor 48 is in electrical communication with the rear steering controller 40 to enable closed-loop control of the rear steering angle $\delta_R$.

The relay 50 is used to short (i.e., electrically connect together) the two or more motor terminals of the rear steering motor 46 to provide a braking force. In an exemplary embodiment, the relay 50 includes a first set of relay terminals **64*a*, a second set of relay terminals 64*b*, a plurality of electromagnetically controllable switches 66, and an energizing coil 68. Each of the first set of relay terminals 64*a* are electrically isolated from each other, and one of the first set of relay terminals 64*a* is in electrical communication with each of the two or more motor terminals of the rear steering motor 46 (i.e., the first motor terminal 60*a*, the second motor terminal 60*b*, and the third motor terminal 60*c*) as shown in FIG. 2. Each of the second set of relay terminals 64*b*** are electrically connected to each other (i.e., shorted together).

The plurality of electromagnetically controllable switches 66 includes normally closed switches. In the scope of the present disclosure, "normally closed" means that each of the plurality of electromagnetically controllable switches 66 is closed (i.e., conducting) when the energizing coil 68 is deenergized. In a non-limiting example, the relay 50 includes a mechanism (not shown) that provides a spring force to hold each of the plurality of electromagnetically controllable switches 66 in the closed position when the energizing coil 68 is deenergized.

When the energizing coil 68 is powered by the positive bus **56*a* and the negative bus 56*b* via the rear steering controller 40, each the plurality of electromagnetically controllable switches 66 are held in the open (i.e., nonconducting) position such that the rear steering motor 46 functions normally. When the energizing coil 68 is not powered (e.g., because the rear steering controller 40 deenergizes the energizing coil 68 or because the positive bus 56*a* and the negative bus 56*b* are not powered), the plurality of electromagnetically controllable switches 66 switch to the closed (i.e., conducting) position, electrically connecting the two or more motor terminals of the rear steering motor 46 (i.e., the first motor terminal 60*a*, the second motor terminal 60*b*, and the third motor terminal 60*c*) together. Electrically connecting the first motor terminal 60*a*, the second motor terminal 60*b*, and the third motor terminal 60*c* of the rear steering motor 46** together causes the back-electromagnetic field (back-EMF) induced by the rotor to drive circulating currents through the stator windings. The circulating currents induce a magnetic field which opposes the rotor's motion, resulting in a braking torque. This is also known as dynamic braking or three-phase short braking.

The energizing coil 68 is in electrical communication with the rear steering controller 40 such that the rear steering controller 40 can control current flow between the positive bus **56*a* and negative bus 56*b* and the energizing coil 68. In the event of a complete power failure, where neither the primary power source 20 nor the secondary power source 42** are powering the positive bus 56*a* and negative bus 56*b*, the energizing coil 68 will become deenergized and the plurality of electromagnetically controllable switches 66 will close.

In a non-limiting example, the relay 50 is realized using a triple-pole, single-throw (TPST) relay. In another non-limiting example, the relay 50 is realized using a triple-pole, double-throw (TPDT) relay. It should be understood that any suitable electrically or electromagnetically controllable switch, relay, contactor, or the like may be utilized without departing from the scope of the present disclosure.

Figure 3:
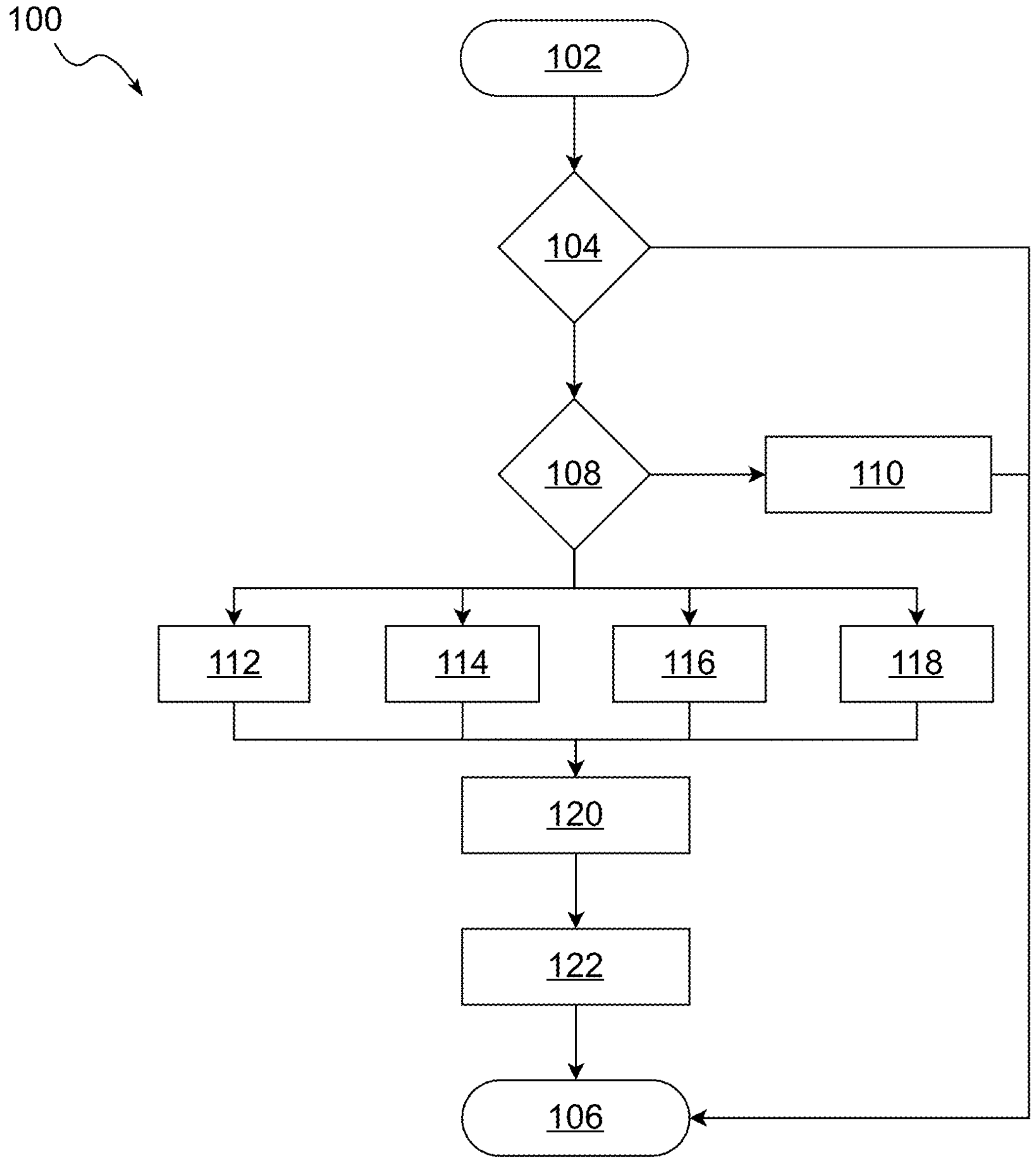
FIG. 3 is a flowchart of a method for controlling the rear steering motor with the rear steering system, according to an exemplary embodiment.

Referring to FIG. 3, a flowchart of the method 100 for controlling the rear steering motor 46 is shown. In the following description, the method 100 will be executed by the rear steering controller 40 for the sake of example. However, it should be understood that the method 100 may also be performed by the vehicle controller 14, for example, if the rear steering controller 40 is realized as a software module of the vehicle controller 14 as discussed above. The method 100 begins at block 102 and proceeds to block 104.

At block 104, the rear steering controller 40 identifies a primary power failure condition. In the scope of the present disclosure, the primary power failure condition means that the rear steering system 10 and the rear steering motor 46 are not receiving power from the primary power source 20. In a non-limiting example, the primary power failure condition can occur because of a hardware failure or software error that results in an interruption of the current-carrying path(s) between the primary power source 20 and the rear steering system 10. Causes of the primary power failure condition may include, for example, a blown fuse, a tripped circuit breaker, a damaged conductor, a malfunctioning power electronic component (e.g., switch, relay, contactor, power converter, etc.), activation of a safety interlock, activation of an emergency stop function, activation of a fail-safe or "limp" mode, a low state of charge of the primary power source 20, and/or the like. It should be understood that any event which results in an unintended loss of power from the primary power source 20 at the rear steering system 10 can cause the primary power failure condition.

In an exemplary embodiment, the rear steering controller 40 identifies the primary power failure condition in response to receiving a diagnostic message from another vehicle component (e.g., the vehicle controller 14, the BMS of the primary power source 20, and/or the like). In another exemplary embodiment, the rear steering controller 40 identifies the primary power failure condition using current sensors which measure current flow between the primary power source 20 and the rear steering system 10. In another exemplary embodiment, the rear steering controller 40 identifies the primary power failure condition by monitoring the positive bus 56*a* and the negative bus 56*b* for voltage fluctuations. It should be understood that various additional methods for identifying the primary power failure condition are within the scope of the present disclosure. If the primary power failure condition is not identified at block 104, the method 100 proceeds to enter a standby state at block 106. If the primary power failure condition is identified at block 104, the method 100 proceeds to block 108.

At block 108, the rear steering controller 40 determines whether the rear steering angle $\delta_R$ is substantially equal to zero. In an exemplary embodiment, the rear steering controller 40 uses the rear steering angle sensor 48 to measure the rear steering angle $\delta_R$. If the rear steering angle $\delta_R$ is substantially equal to zero, the method 100 proceeds to block 110. If the rear steering angle $\delta_R$ is not substantially equal to zero, the method 100 proceeds to blocks 112, 114, 116, and 118, as will be discussed below.

At block 110, the rear steering controller 40 locks the rear steering motor 46 in response to determining that the rear steering angle $\delta_R$ is substantially equal to zero at block 108. In an exemplary embodiment, to lock the rear steering motor 46, the rear steering controller 40 deenergizes the energizing coil 68 of the relay 50 to electrically connect the first motor terminal 60*a*, the second motor terminal 60*b*, and the third motor terminal 60*c* together. Locking the rear steering motor 46 at block 110 mitigates further change in the rear steering angle $\delta_R$, maintaining the rear steering angle $\delta_R$ at substantially equal to zero in response to identifying the primary power failure condition. After block 110, the method 100 proceeds to enter the standby state at block 106.

At block 112, the rear steering controller 40 calculates a state of charge (SOC) angle limit based at least in part on a state of charge of the secondary power source 42. In an exemplary embodiment, the SOC angle limit varies directly with the state of charge of the secondary power source 42 when the SOC of the secondary power source 42 is less than a predetermined SOC threshold. In a non-limiting example, the SOC of the secondary power source 42 is determined based at least in part on a measured voltage between the positive bus 56*a* and the negative bus 56*b* and a known voltage-SOC relationship of the secondary power source 42. In an exemplary embodiment, the relationship between the SOC angle limit and the SOC of the secondary power source 42 is stored in the media 54 of the rear steering controller 40 as a look-up-table or a mathematical equation.

Figure 4:
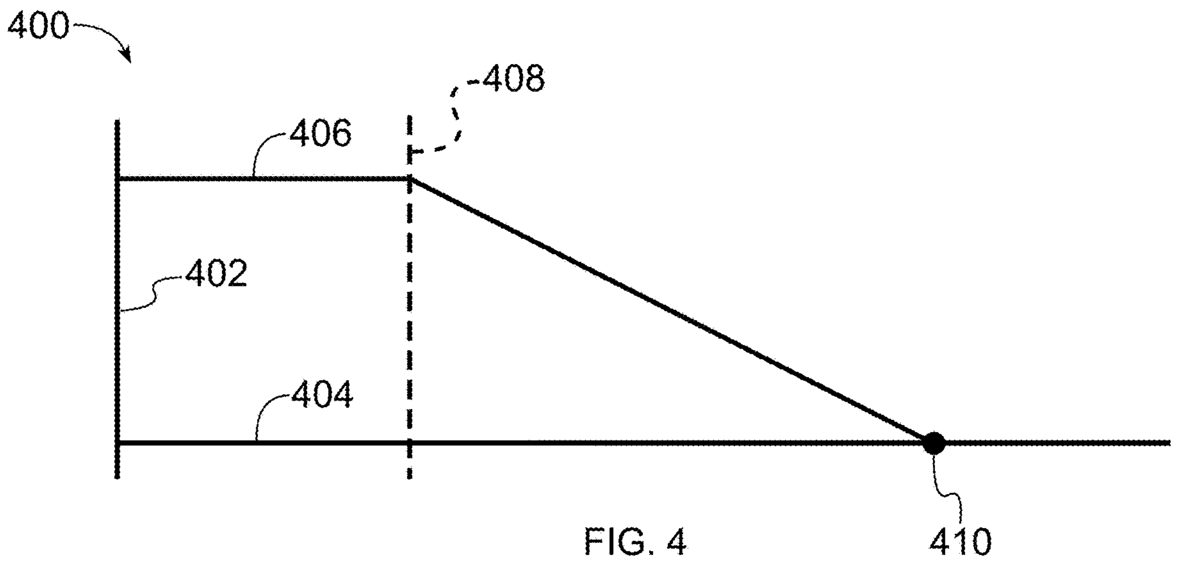
FIG. 4 is an exemplary SOC angle limit graph illustrating an exemplary relationship between an SOC angle limit and an SOC of a secondary power source, according to an exemplary embodiment.

Referring to FIG. 4, an exemplary SOC angle limit graph 400 illustrating an exemplary relationship between the SOC angle limit and the SOC of the secondary power source 42 is shown. The exemplary SOC angle limit graph 400 includes a vertical axis 402 denoting the angle (with angle increasing from bottom to top), a horizontal axis 404 denoting the SOC of the secondary power source 42 (with SOC decreasing from left to right), and an exemplary SOC angle limit 406. In an exemplary embodiment, the exemplary SOC angle limit 406 remains constant at an initial value until the SOC of the secondary power source 42 reaches the predetermined SOC threshold (e.g., eighty percent) denoted by the dashed vertical line 408, after which the exemplary SOC angle limit 406 linearly decreases until reaching zero at an exemplary minimum SOC point 410 (e.g., thirty percent). It should be understood that the exemplary SOC angle limit graph 400 is not necessarily to-scale, and that the values discussed above are merely exemplary in nature.

In an exemplary embodiment, the parameters of the relationship between the SOC angle limit and the SOC of the secondary power source 42 are determined based at least in part on a charge capacity of the secondary power source 42 and a known or estimated power consumption of the rear steering motor 46. In a non-limiting example, the initial value of the SOC angle limit, the value of the predetermined SOC threshold, the minimum SOC point, and the overall shape of the relationship between the SOC angle limit and the SOC of the secondary power source 42 are determined such that the secondary power source 42 will always have enough energy to return the rear steering angle $\delta_R$ to zero. Referring again to FIG. 3, after block 112, the method 100 proceeds to block 120 as will be discussed below.

At block 114, the rear steering controller 40 calculates a speed angle limit based at least in part on a speed of the vehicle 12. In an exemplary embodiment, the speed angle limit varies inversely with the speed of the vehicle 12 when the speed of the vehicle 12 is greater than a predetermined speed threshold. In an exemplary embodiment, the relationship between the speed angle limit and the speed of the vehicle 12 is stored in the media 54 of the rear steering controller 40 as a look-up-table or a mathematical equation.

Figure 5:
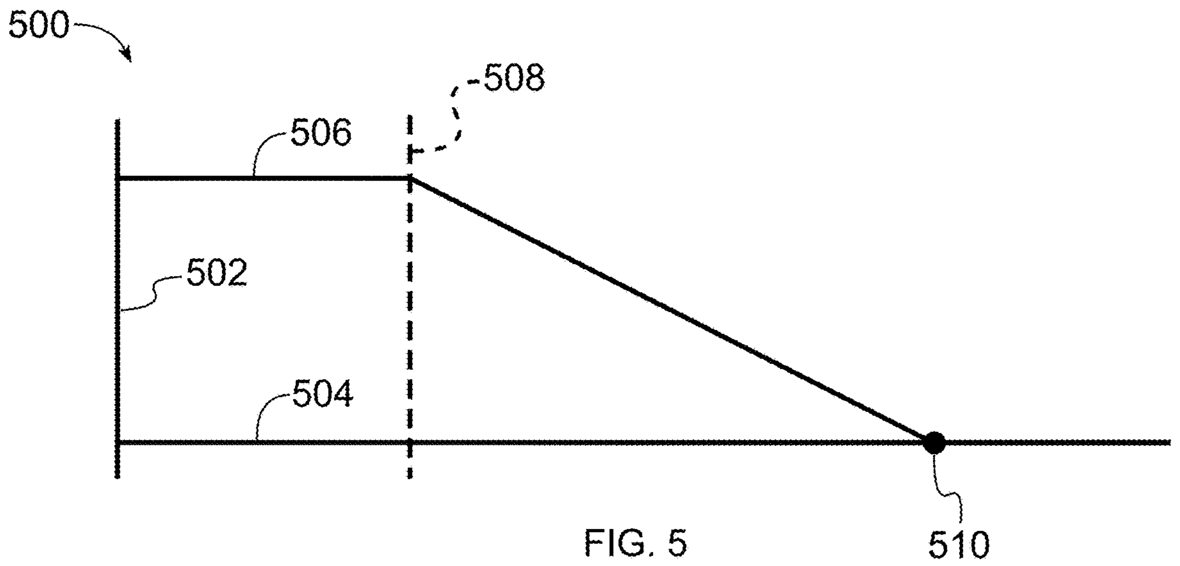
FIG. 5 is an exemplary speed angle limit graph illustrating an exemplary relationship between a speed angle limit and a speed of the vehicle, according to an exemplary embodiment.

Referring to FIG. 5, an exemplary speed angle limit graph 500 illustrating an exemplary relationship between the speed angle limit and the speed of the vehicle 12 is shown. The exemplary speed angle limit graph 500 includes a vertical axis 502 denoting the angle (with angle increasing from bottom to top), a horizontal axis 504 denoting the speed of the vehicle 12 (with speed increasing from left to right), and an exemplary speed angle limit 506. In an exemplary embodiment, the exemplary speed angle limit 506 remains constant at an initial value until the speed of the vehicle 12 reaches the predetermined speed threshold (e.g., two kilometers per hour) denoted by the dashed vertical line 508, after which the exemplary speed angle limit 506 linearly decreases until reaching zero at an exemplary maximum speed point 510 (e.g., ten kilometers per hour). It should be understood that the exemplary speed angle limit graph 500 is not necessarily to-scale, and that the values discussed above are merely exemplary in nature.

In an exemplary embodiment, the parameters of the relationship between the speed angle limit and the speed of the vehicle 12 are determined based at least in part on a known relationship between speed of the vehicle 12 and torque required to turn the rear wheels 34*b*. In a non-limiting example, the initial value of the speed angle limit, the value of the predetermined speed threshold, the maximum speed point, and the overall shape of the relationship between the speed angle limit and the speed of the vehicle 12 are determined such that the secondary power source 42 will always have enough energy to return the rear steering angle $\delta_R$ to zero. In an exemplary embodiment, the overall shape of the relationship between the speed angle limit and the speed of the vehicle 12 is determined such as to take advantage of the opportunity to return the rear steering angle $\delta_R$ to zero when less torque is required due to higher vehicle speed. Referring again to FIG. 3, after block 114, the method 100 proceeds to block 120 as will be discussed below.

At block 116, the rear steering controller 40 calculates an elapsed time angle limit based at least in part on an elapsed time since identifying the primary power failure condition. In an exemplary embodiment, the elapsed time angle limit varies inversely with the elapsed time when the elapsed time is greater than a predetermined elapsed time threshold. In an exemplary embodiment, the relationship between the elapsed time angle limit and the elapsed time since identifying the primary power failure condition is stored in the media 54 of the rear steering controller 40 as a look-up-table or a mathematical equation.

Figure 6:
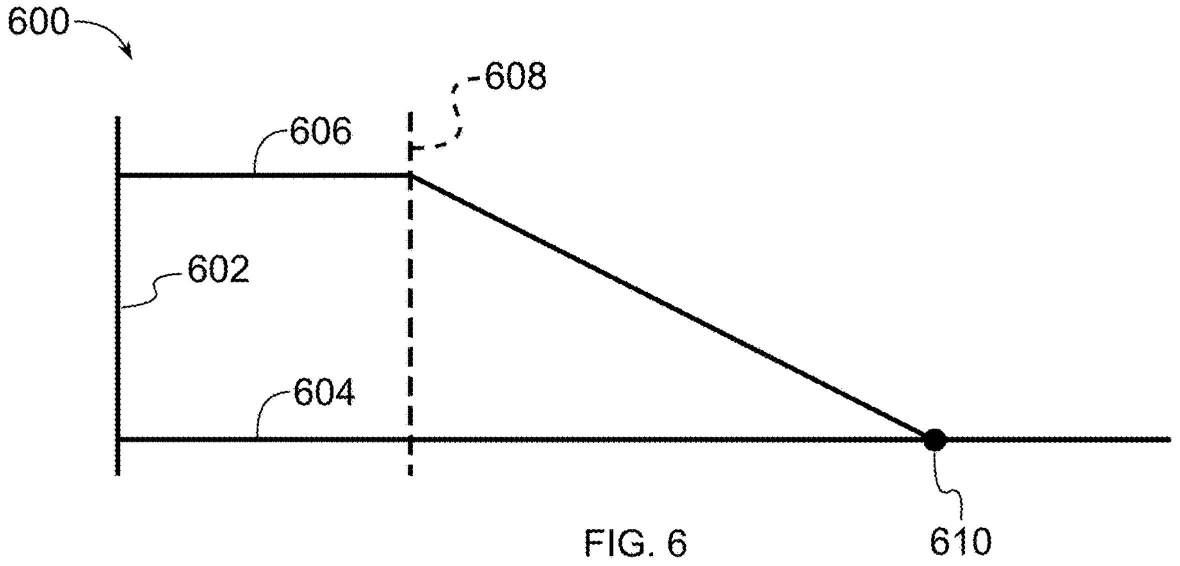
FIG. 6 is an exemplary elapsed time angle limit graph illustrating an exemplary relationship between an elapsed time angle limit and an elapsed time since identifying a primary power failure condition, according to an exemplary embodiment.

Referring to FIG. 6, an exemplary elapsed time angle limit graph 600 illustrating an exemplary relationship between the elapsed time angle limit and the elapsed time since identifying the primary power failure condition is shown. The exemplary elapsed time angle limit graph 600 includes a vertical axis 602 denoting the angle (with angle increasing from bottom to top), a horizontal axis 604 denoting the elapsed time since identifying the primary power failure condition (with elapsed time increasing from left to right), and an exemplary elapsed time angle limit 606. In an exemplary embodiment, the exemplary elapsed time angle limit 606 remains constant at an initial value until the elapsed time since identifying the primary power failure condition reaches the predetermined elapsed time threshold (e.g., thirty seconds) denoted by the dashed vertical line 608, after which the exemplary elapsed time angle limit 606 linearly decreases until reaching zero at an exemplary maximum elapsed time point 610 (e.g., sixty seconds). It should be understood that the exemplary elapsed time angle limit graph 600 is not necessarily to-scale, and that the values discussed above are merely exemplary in nature.

In an exemplary embodiment, the parameters of the relationship between the elapsed time angle limit and the elapsed time since identifying the primary power failure condition are determined to provide a fail-safe function which will return the rear steering angle $\delta_R$ to zero even if communication to other sensors (e.g., the wheel speed sensor) or the secondary power source 42 is lost. In a non-limiting example, the initial value of the elapsed time angle limit, the value of the predetermined elapsed time threshold, the maximum elapsed time point, and the overall shape of the relationship between the elapsed time angle limit and the elapsed time since identifying the primary power failure condition are determined such that the secondary power source 42 will always have enough energy to return the rear steering angle $\delta_R$ to zero. Referring again to FIG. 3, after block 116, the method 100 proceeds to block 120 as will be discussed below.

At block 118, the rear steering controller 40 calculates an initial angle limit based at least in part on an initial rear steering angle of the rear steering motor 46. The initial rear steering angle is based at least in part on the rear steering angle $\delta_R$ measured at the time at which the primary power failure condition is identified. In an exemplary embodiment, the initial angle limit is a constant less than or equal to the initial rear steering angle. In a non-limiting example, the initial angle limit is a constant equal to the absolute value of the initial rear steering angle:

$$\delta_{I,L} = |\delta_R(t_0)| \tag{1}$$

where $\delta_{1,L}$ is the initial angle limit, $t_0$ is the time at which the primary power failure condition was identified, and $|\delta R(t_0)|$ is the absolute value of the rear steering angle $\delta_R$ measured at the time at which the primary power failure condition was identified (i.e., the initial rear steering angle).

In another exemplary embodiment, the initial angle limit is a dynamic value which monotonically decreases over time based on the rear steering angle $\delta_R$ such that:

$$\delta_{I,L}(t) = \min_{s\in[t_0,t]}|\delta_R(s)| \tag{2}$$

where $\delta_{1,L}(t)$ is the initial angle limit at time t, $t_0$ is the time at which the primary power failure condition was identified, and $|\delta_R(s)|$ is the absolute value of the rear steering angle $\delta_R$ measured at time s. In other words, the initial angle limit is always equal to the lowest magnitude value of the rear steering angle $\delta_R$ which has occurred since the primary power failure condition was identified.

This can also be expressed in discrete time as:

$$\delta_{I,L}(t_k) = \min(|\delta_R(t_k)|, \delta_{I,L}(t_{k-1}), |\delta_R(t_0)|) \tag{3}$$

where $\delta_{1,L}(t_k)$ is the initial angle limit at timestep k, $t_0$ is the time at which the primary power failure condition was identified, $|\delta R(t_0)|$ is the absolute value of the rear steering angle $\delta_R$ measured at the time at which the primary power failure condition was identified, $|\delta R(t_k)|$ is the absolute value of the rear steering angle $\delta_R$ measured at timestep k, and $\delta_{1,L}(t_{k-1})$ is the initial angle limit at timestep k−1. In other words, the initial angle limit is always equal to the lowest of the absolute value of the rear steering angle $\delta_R$ at the current time step, the initial angle limit at the previous time step, and the absolute value of the rear steering angle $\delta_R$ measured at the time at which the primary power failure condition was identified (i.e., the initial rear steering angle).

Therefore, in both exemplary embodiments, the upper bound of the initial angle limit is the absolute value of the rear steering angle $\delta_R$ measured at the time at which the primary power failure condition is identified (i.e., the initial rear steering angle). In the dynamic exemplary embodiment, the initial angle limit is equal to the absolute value of the rear steering angle $\delta_R$ if the absolute value of the rear steering angle $\delta_R$ decreases or remains constant. If the absolute value of the rear steering angle $\delta_R$ increases, the initial angle limit remains constant. After block 118, the method 100 proceeds to block 120.

At block 120, the rear steering controller 40 calculates the maximum rear steering angle limit for the rear steering motor 46 in response to identifying the primary power failure condition at block 104. As discussed above, the maximum rear steering angle limit is defined as a maximum allowed absolute value of the rear steering angle $\delta_R$. Furthermore, the vehicle controller 14 and/or the rear steering controller 40 use the maximum rear steering angle limit to control the rear steering motor 46. In an exemplary embodiment, the maximum rear steering angle limit is a minimum of the state of charge angle limit determined at block 112, the speed angle limit determined at block 114, the elapsed time angle limit determined at block 116, and the initial angle limit determined at block 118. After block 120, the method 100 proceeds to block 122.

At block 122, the rear steering controller 40 maintains the rear steering angle $\delta_R$ within the maximum rear steering angle limit determined at block 120 using the secondary power source 42. In an exemplary embodiment, the rear steering controller 40 ensures that the absolute value of the rear steering angle $\delta_R$ is always less than or equal to the maximum rear steering angle limit. In an exemplary embodiment, if rear steering setpoint commands are received from the vehicle controller 14, the rear steering controller 40 is configured to actuate the rear steering motor 46 to satisfy the rear steering setpoint commands as effectively as possible while also maintaining the rear steering angle $\delta_R$ within the maximum rear steering angle limit.

As discussed above, in the event that the rear steering angle $\delta_R$ violates the maximum rear steering angle limit (e.g., due to dynamic changes in the maximum rear steering angle limit, as discussed above), the rear steering controller 40 is configured to smoothly and automatically adjust the rear steering angle $\delta_R$ such that the absolute value of the rear steering angle $\delta_R$ is less than or equal to the maximum rear steering angle limit. In a non-limiting example, automatic correction of the rear steering angle $\delta_R$ is paused or disabled under certain operational conditions (e.g., measured using the plurality of vehicle sensors 16), for example, if vehicle speed is above a predetermined threshold, lateral vehicle acceleration is above a predetermined threshold, and/or the like. In an exemplary embodiment, control of the rear steering controller 40 at block 122 ultimately results in the rear steering angle $\delta_R$ returning to substantially equal to zero before the secondary power source 42 runs out of stored energy, allowing for locking of the rear steering motor 46 at blocks 108 and 110 upon subsequent execution of the method 100. After block 122, the method 100 proceeds to enter the standby state at block 106.

In an exemplary embodiment, the rear steering controller 40 repeatedly exits the standby state 106 and restarts the method 100 at block 102. In a non-limiting example, the rear steering controller 40 exits the standby state 106 and restarts the method 100 on a timer, for example, every three hundred milliseconds.

The system 10 and method 100 of the present disclosure offer several advantages. Using the system 10 and method 100, the rear steering angle $\delta_R$ is automatically returned to zero and the rear steering motor 46 is locked in the event of primary power failure condition. Furthermore, the method 100 returns the rear steering angle $\delta_R$ to zero with minimal disruption to the operator of the vehicle 12 while also ensuring that the rear steering angle $\delta_R$ returns to zero before the secondary power source 42 runs out of charge. The elapsed time angle limit discussed at block 116 allows the system 10 and method 100 continue to perform this function even if communication with other vehicle systems is not possible. Furthermore, the system 10 provides a further fail-safe function because the energizing coil 68 is naturally deenergized upon failure or loss of charge of the secondary power source 42, locking the rear steering motor 46. Locking of the rear steering motor 46 is accomplished electrically without the need for any additional steering hardware components and is fully reversable upon resolution of the primary power failure condition. Locking the rear steering motor 46 allows for safer and easier driving or transportation of the vehicle 12 until the primary power failure condition is resolved.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling a rear steering motor for a vehicle, the method comprising:

identifying a primary power failure condition of the rear steering motor in response to determining that the rear steering motor is not receiving power from a primary power source;

calculating a maximum rear steering angle limit for the rear steering motor in response to identifying the primary power failure condition;

maintaining a rear steering angle of the rear steering motor within the maximum rear steering angle limit by actuating the rear steering motor using a secondary power source; and locking the rear steering motor in response to determining that the rear steering angle is substantially equal to zero.

2. The method of claim 1, wherein identifying the primary power failure condition of the rear steering motor further comprises:

identifying a primary power failure condition of the rear steering motor in response to determining that the rear steering motor is not receiving power from the primary power source, wherein the primary power source includes at least one of: a low-voltage battery of the vehicle and a high-voltage battery of the vehicle.

3. The method of claim 1, wherein calculating the maximum rear steering angle limit further comprises:

calculating the maximum rear steering angle limit based at least in part on a state of charge of the secondary power source, wherein the maximum rear steering angle limit varies directly with the state of charge of the secondary power source when the state of charge of the secondary power source is less than a predetermined state of charge threshold.

4. The method of claim 1, wherein calculating the maximum rear steering angle limit further comprises:

calculating the maximum rear steering angle limit based at least in part on a speed of the vehicle, wherein the maximum rear steering angle limit varies inversely with the speed of the vehicle when the speed of the vehicle is greater than a predetermined speed threshold.

5. The method of claim 1, wherein calculating the maximum rear steering angle limit further comprises:

calculating the maximum rear steering angle limit based at least in part on an elapsed time since identifying the primary power failure condition, wherein the maximum rear steering angle limit varies inversely with the elapsed time when the elapsed time is greater than a predetermined elapsed time threshold.

6. The method of claim 1, wherein calculating the maximum rear steering angle limit further comprises:

calculating the maximum rear steering angle limit based at least in part on an initial rear steering angle of the rear steering motor, wherein the maximum rear steering angle limit is less than or equal to the initial rear steering angle, and wherein the initial rear steering angle is measured in response to identifying the primary power failure condition.

7. The method of claim 1, wherein maintaining the rear steering angle of the rear steering motor within the maximum rear steering angle limit further comprises:

maintaining the rear steering angle of the rear steering motor within the maximum rear steering angle limit by actuating the rear steering motor using the secondary power source, wherein an energy storage capacity of the secondary power source is less than an energy storage capacity of the primary power source.

8. The method of claim 7, wherein maintaining the rear steering angle of the rear steering motor within the maximum rear steering angle limit further comprises:

maintaining the rear steering angle of the rear steering motor within the maximum rear steering angle limit by actuating the rear steering motor using the secondary power source, wherein the secondary power source is more proximal to the rear steering motor than the primary power source.

9. The method of claim 8, wherein maintaining the rear steering angle of the rear steering motor within the maximum rear steering angle limit further comprises:

maintaining the rear steering angle of the rear steering motor within the maximum rear steering angle limit by actuating the rear steering motor using the secondary power source, wherein the secondary power source includes at least one of: a rechargeable battery and a supercapacitor.

10. The method of claim 1, wherein locking the rear steering motor further comprises:

electrically connecting two or more motor terminals of the rear steering motor together.

11. A system for controlling a rear steering motor for a vehicle, the system for controlling the rear steering motor comprising:

the rear steering motor having two or more motor terminals;

a relay in electrical communication with the two or more motor terminals of the rear steering motor;

a secondary power source configured to provide power to the rear steering motor, wherein an energy storage capacity of the secondary power source is less than an energy storage capacity of a primary power source of the vehicle;

a controller in electrical communication with the rear steering motor, the relay, and the secondary power source, wherein the controller is programmed to:

identify a primary power failure condition of the rear steering motor in response to determining that the rear steering motor is not receiving power from the primary power source;

calculate a maximum rear steering angle limit for the rear steering motor in response to identifying the primary power failure condition;

maintain a rear steering angle of the rear steering motor within the maximum rear steering angle limit by actuating the rear steering motor using the secondary power source; and lock the rear steering motor using the relay in response to determining that the rear steering angle is substantially equal to zero.

12. The system for controlling the rear steering motor of claim 11, wherein to calculate the maximum rear steering angle limit, the controller is further programmed to:

calculate a state of charge angle limit based at least in part on a state of charge of the secondary power source;

calculate a speed angle limit based at least in part on a speed of the vehicle;

calculate an elapsed time angle limit based at least in part on an elapsed time since identifying the primary power failure condition;

calculate an initial angle limit based at least in part on an initial rear steering angle of the rear steering motor, wherein the initial angle limit is less than or equal to the initial rear steering angle, and wherein the initial rear steering angle is measured in response to identifying the primary power failure condition; and calculate the maximum rear steering angle limit, wherein the maximum rear steering angle limit is a minimum of the state of charge angle limit, the speed angle limit, the elapsed time angle limit, and the initial angle limit.

13. The system for controlling the rear steering motor of claim 12, wherein the state of charge angle limit varies directly with the state of charge of the secondary power source when the state of charge of the secondary power source is less than a predetermined state of charge threshold.

14. The system for controlling the rear steering motor of claim 12, wherein the speed angle limit varies inversely with the speed of the vehicle when the speed of the vehicle is greater than a predetermined speed threshold.

15. The system for controlling the rear steering motor of claim 12, wherein the elapsed time angle limit varies inversely with the elapsed time when the elapsed time is greater than a predetermined elapsed time threshold.

16. The system for controlling the rear steering motor of claim 11, wherein:

the primary power source includes at least one of: a low-voltage battery of the vehicle and a high-voltage battery of the vehicle; and the secondary power source includes at least one of: a rechargeable battery and a supercapacitor.

17. The system for controlling the rear steering motor of claim 11, the relay further comprising:

a first set of relay terminals, wherein each of the first set of relay terminals are electrically isolated from each other, and wherein one of the first set of relay terminals is in electrical communication with each of the two or more motor terminals of the rear steering motor;

a second set of relay terminals, wherein each of the second set of relay terminals are electrically connected to each other;

a plurality of electromagnetically controllable switches, wherein each of the first set of relay terminals is connected to one of the second set of relay terminals with one of the plurality of electromagnetically controllable switches, and wherein each of the plurality of electromagnetically controllable switches is normally closed;

an energizing coil for controlling the plurality of electromagnetically controllable switches, wherein the plurality of electromagnetically controllable switches are open when the energizing coil is energized and closed when the energizing coil is deenergized, and wherein the energizing coil is in electrical communication with the controller; and wherein to lock the rear steering motor using the relay, the controller is further programmed to:

monitor the rear steering angle of the rear steering motor; and deenergize the energizing coil of the relay to close the plurality of electromagnetically controllable switches and electrically connect the two or more motor terminals of the rear steering motor together in response to determining that the rear steering angle is substantially equal to zero.

18. A method for controlling a rear steering motor for a vehicle, the method comprising:

identifying a primary power failure condition of the rear steering motor in response to determining that the rear steering motor is not receiving power from a primary power source using a controller, wherein the primary power source includes at least one of: a low-voltage battery of the vehicle and a high-voltage battery of the vehicle;

calculating a maximum rear steering angle limit for the rear steering motor using the controller in response to identifying the primary power failure condition;

maintaining a rear steering angle of the rear steering motor within the maximum rear steering angle limit using the controller by actuating the rear steering motor using a secondary power source, wherein the secondary power source includes at least one of: a rechargeable battery and a supercapacitor; and locking the rear steering motor by using the controller to operate a relay in response to determining that the rear steering angle is substantially equal to zero.

19. The method of claim 18, wherein calculating the maximum rear steering angle limit further comprises:

calculating a state of charge angle limit based at least in part on a state of charge of the secondary power source, wherein the state of charge angle limit varies directly with the state of charge of the secondary power source when the state of charge of the secondary power source is less than a predetermined state of charge threshold;

calculating a speed angle limit based at least in part on a speed of the vehicle, wherein the speed angle limit varies inversely with the speed of the vehicle when the speed of the vehicle is greater than a predetermined speed threshold;

calculating an elapsed time angle limit based at least in part on an elapsed time since identifying the primary power failure condition, wherein the elapsed time angle limit varies inversely with the elapsed time when the elapsed time is greater than a predetermined elapsed time threshold;

calculating an initial angle limit based at least in part on an initial rear steering angle of the rear steering motor, wherein the initial angle limit is less than or equal to the initial rear steering angle, and wherein the initial rear steering angle is measured in response to identifying the primary power failure condition; and calculating the maximum rear steering angle limit, wherein the maximum rear steering angle limit is a minimum of the state of charge angle limit, the speed angle limit, the elapsed time angle limit, and the initial angle limit.

20. The method of claim 19, wherein locking the rear steering motor further comprises:

monitoring the rear steering angle of the rear steering motor; and deenergizing an energizing coil of the relay to close a plurality of electromagnetically controllable switches of the relay in response to determining that the rear steering angle is substantially equal to zero, wherein each of the plurality of electromagnetically controllable switches electrically connects one of a first set of relay terminals of the relay to one of a second set of relay terminals of the relay, wherein each of the first set of relay terminals is in electrical communication with one of two or more motor terminals of the rear steering motor, and wherein each of the second set of relay terminals are electrically connected together.

* * * * *